(12) United States Patent
Kurtovic

(10) Patent No.: US 9,868,377 B2
(45) Date of Patent: Jan. 16, 2018

(54) VEHICLE HEATED CUP HOLDER SYSTEM

(71) Applicant: Toyota Motor Engineering & Manufacturing North America, Inc., Erlanger, KY (US)

(72) Inventor: Kenan Kurtovic, Ferndale, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 243 days.

(21) Appl. No.: 14/604,725

(22) Filed: Jan. 25, 2015

(65) Prior Publication Data

US 2016/0214521 A1 Jul. 28, 2016

(51) Int. Cl.
| | |
|---|---|
| *H05B 6/12* | (2006.01) |
| *A47J 31/06* | (2006.01) |
| *F25B 21/00* | (2006.01) |
| *B60N 3/10* | (2006.01) |
| *A47G 23/02* | (2006.01) |

(52) U.S. Cl.
CPC ...... *B60N 3/104* (2013.01); *A47G 2023/0291* (2013.01)

(58) Field of Classification Search
CPC .............. B60N 3/104; A47G 2023/0291
USPC ....... 219/621, 622, 635, 663, 666, 667, 676, 219/600; 99/342, 275
See application file for complete search history.

(56) References Cited

U.S. PATENT DOCUMENTS

| | | | |
|---|---|---|---|
| 4,453,685 A | 6/1984 | McMurray | |
| 5,335,960 A | 8/1994 | Benignu, Jr. | |
| 6,121,585 A | 9/2000 | Dam | |
| 6,870,135 B2 | 3/2005 | Hamm et al. | |
| 7,994,454 B2 | 8/2011 | Traylor | |
| 2006/0266757 A1* | 11/2006 | Camacho | A21B 3/136 220/574 |
| 2009/0065500 A1* | 3/2009 | England | A47J 27/002 219/621 |
| 2013/0306617 A1* | 11/2013 | Soule | A47J 36/2461 219/442 |

FOREIGN PATENT DOCUMENTS

| | | | |
|---|---|---|---|
| CN | 203020131 U | * 6/2013 | |
| WO | WO 9851128 A1 | * 11/1998 | H04B 3/746 |

OTHER PUBLICATIONS

Translation of CN203020131U, Zhang Silang et al., Vehicle-mounted Wireless Heating Device, Jun. 26, 2013, ProQuest Dialog.*

Translation of WO9851128A1, Helary Thierry, Home Cooking Detection of Presence Container, Jan. 13, 2016, EPO Patent Translate.*

* cited by examiner

*Primary Examiner* — Quang Van
(74) *Attorney, Agent, or Firm* — Christopher G. Darrow; Darrow Mustafa PC

(57) ABSTRACT

A heated cup holder system for a vehicle includes a sleeve receivable onto a container, the sleeve of a predefined inductance, and a cup holder including an induction-heating element operable to induce a current within the sleeve, thereby heating the sleeve.

26 Claims, 3 Drawing Sheets

VEHICLE HEATED CUP HOLDER SYSTEM

BACKGROUND

The present disclosure relates to a vehicle and, more particularly, to a system in the vehicle for maintaining or increasing the temperature of a hot beverage in a disposable container therefor.

Vehicles often include numerous cup holders. Many commuters purchase hot beverages to drink at a leisurely pace while traveling in their vehicle. Although effective for retaining various beverage containers, vehicle cup holders do nothing to maintain the beverage at a desired temperature.

Many people simply transfer their hot beverages from the ubiquitous cardboard containers to an insulated cup, which can be retained within a cup holder. Although effective for maintaining the beverage therein near the optimum temperature for a period of time, such insulated cups must be transported to the beverage shop and must be washed after use. The convenience of the cardboard container, which can be discarded after the beverage is consumed, is thus lost.

SUMMARY

Described herein is a heated cup holder system which includes a cup holder and a sleeve receivable within the cup holder. In operation, the sleeve is located around a container, such as a cardboard container, and then the container is located within the cup holder. The sleeve has a predefined inductance. Only if that inductance is detected, will an induction-heating element in the cup holder be operable to heat a beverage in the container via induction heating.

A heated cup holder system for a vehicle, according to one disclosed non-limiting embodiment, includes a sleeve receivable onto a container, the sleeve having a predefined inductance, and a cup holder including an induction-heating element operable to induce a current within the sleeve, thereby heating the sleeve.

A vehicle interior, according to another disclosed non-limiting embodiment, includes a sleeve receivable onto a container, the sleeve having a predefined inductance, a cup holder including an induction-heating element operable to induce a current within the sleeve thereby heating the sleeve, and a vehicle head unit in communication with the cup holder.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Discussed herein is a heated cup holder system that advantageously utilizes the ubiquitous cardboard container (or other container type) that can be discarded after a beverage therein is consumed, yet maintains or increases a desired temperature of the beverage therein for prolonged time periods as desired by a user. The heated cup holder system includes an induction-heating element to induce a current in an inner layer of a sleeve for the container to thereby heat the beverage within the container. An outer layer is located around the inner layer to insulate the inner layer such that a user may safely hold the sleeve with the container therein. As the beverage temperature and other data is communicated to a vehicle head unit, the heated cup holder system, and thus the beverage temperature, is readily controlled by the user.

Figure 1:
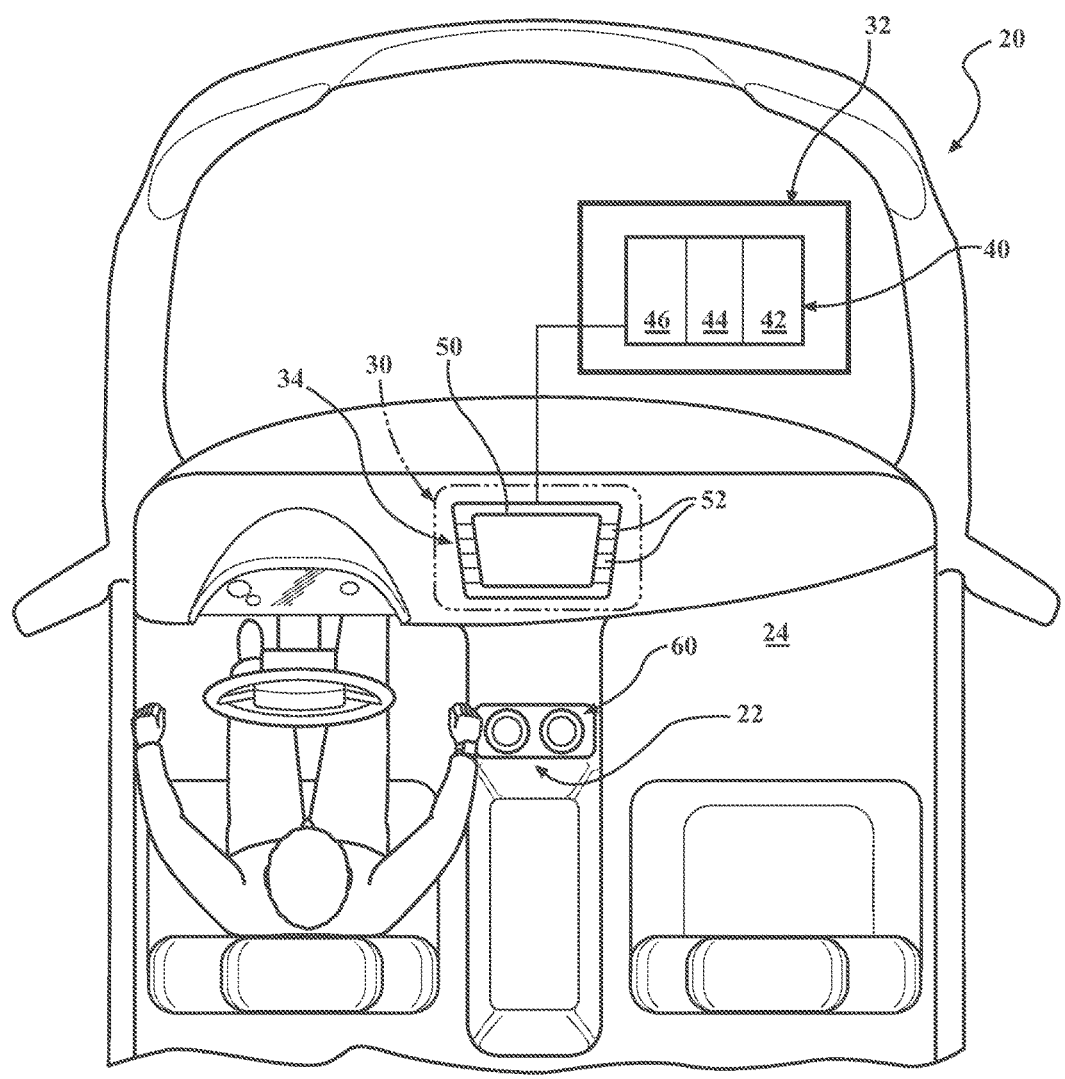
FIG. 1 is a schematic view of an example vehicle interior with a heated cup holder system.

FIG. 1 schematically illustrates a vehicle 20 with one or more heated cup holder systems 22 within a vehicle interior 24. It should be appreciated that although particular systems are separately defined, each or any of the systems may be otherwise combined or separated via hardware and/or software.

The vehicle interior 24 also includes a vehicle head unit 30. As will be further described, the vehicle head unit 30 is operable to display content that can include personalized information, entertainment content such as videos, games, maps, navigation, vehicle diagnostics, calendar information, weather information, vehicle climate controls, vehicle entertainment controls, email, internet browsing, or any other interactive applications associated with a recognized user.

The vehicle head unit 30 generally includes a control system 32 and an interactive display system 34. It should be appreciated that although particular systems are separately defined, each or any of the systems may be otherwise combined or separated via hardware and/or software.

The control system 32 generally includes a control module 40 with a processor 42, a memory 44, and an interface 46. The control module 40 may be a portion of a central vehicle control, a stand-alone unit, or other system such as a cloud-based system. The processor 42 may be any type of microprocessor having desired performance characteristics. The memory 44 may include any type of computer readable medium that stores the data and control algorithms described herein. The interface 46 of the control module 40 facilitates communication between the control module 40 and other systems, such as the interactive display system 34 and the heated cup holder systems 22. The interactive display system 34 includes a display 50 about which control elements 52 are arranged to provide a user interface within the vehicle interior 24. Alternatively, or in addition, the display 50 combines at least some of the control elements 52 into a touch panel display.

Figure 2:
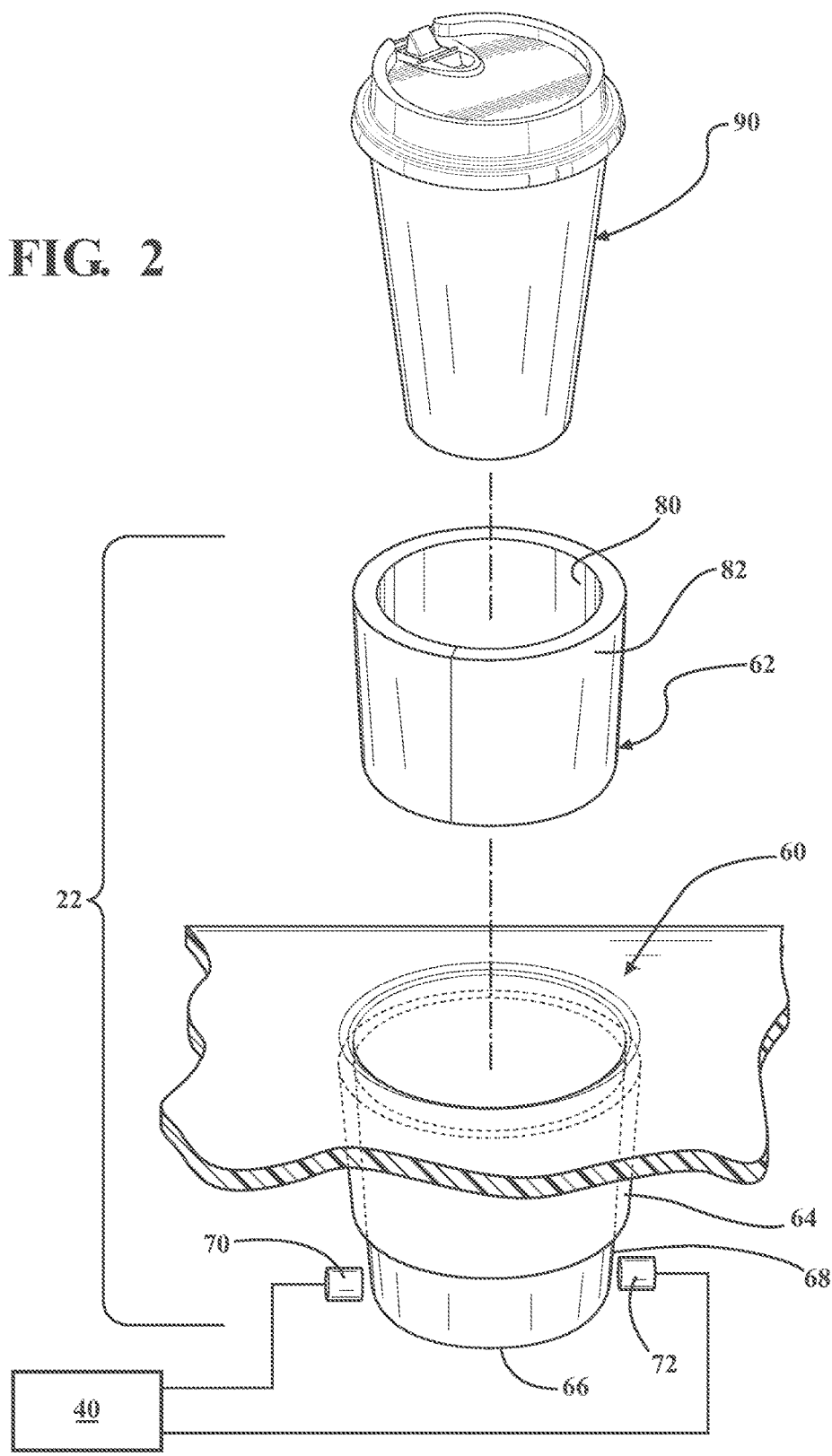
FIG. 2 is an exploded view of a heated cup holder system according to one disclosed non-limiting embodiment.
Figure 3:
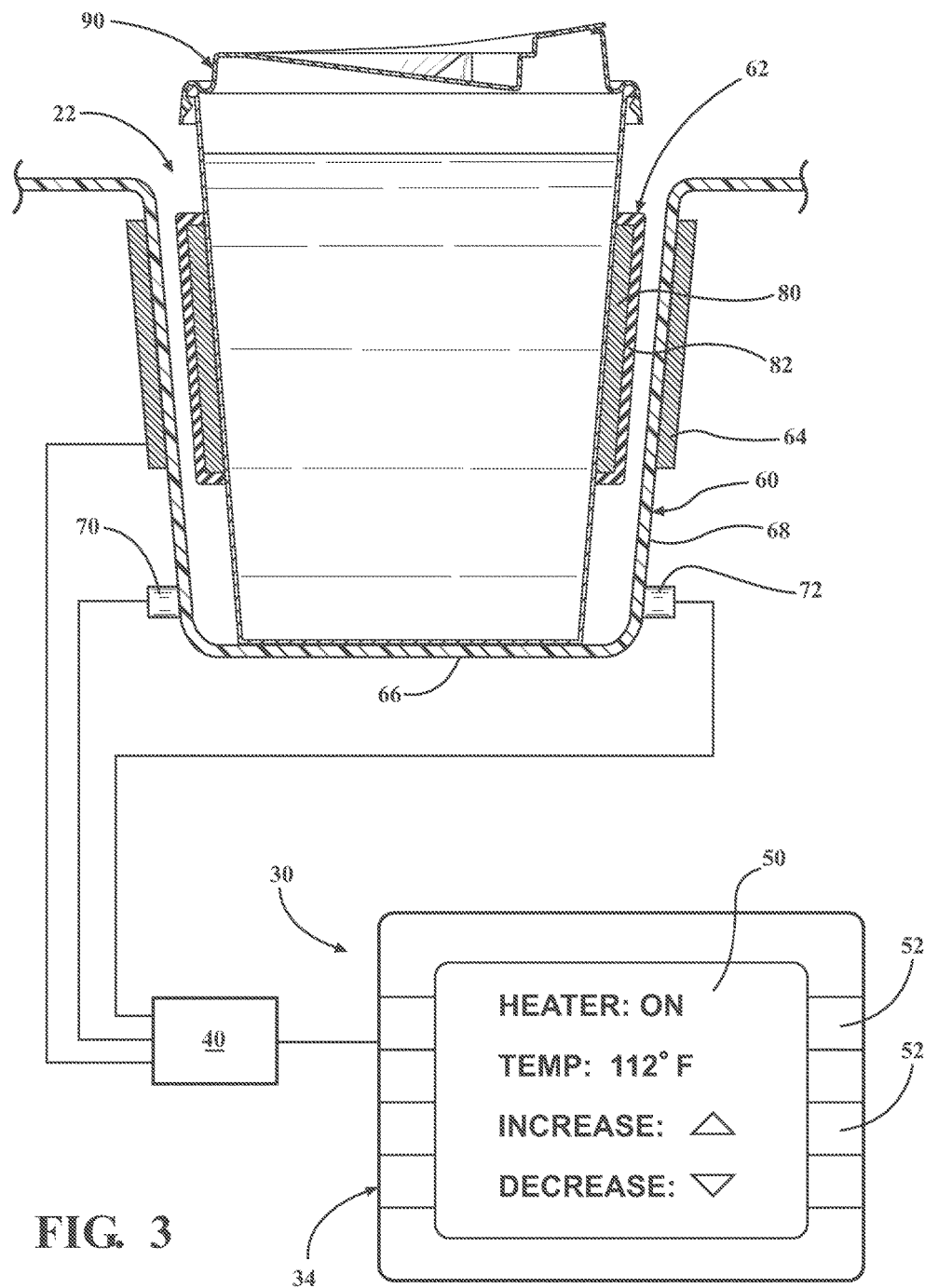
FIG. 3 is a sectional view of the heated cup holder system with a container therein.

With reference to FIGS. 2 and 3, each heated cup holder system 22 includes a cup holder 60 and a sleeve 62 receivable within the cup holder 60. The cup holder 60 is typically a generally cylindrical receptacle with an induction-heating element 64 located in and/or around a bottom surface 66 and/or a wall surface 68. The induction-heating element 64, as well as sensors, including, but not limited to, a temperature sensor 70 and an induction sensor 72, communicate with the processor 42 via the interface 46.

The sleeve 62 may be of an adjustable diameter via for example, a C-shaped resilient material such that the sleeve 62 is readily received onto a container 90 such as a cardboard container, foam container, or other disposable or non-disposable type container of various diameters. Alternatively, the sleeve 62 may be of a fixed diameter readily received onto a majority of commercially available disposable containers typically provided by coffee shops, drive through drive-through establishments, and other places at which hot beverages are sold. In another disclosed non-limiting embodiment, the sleeve 62 is integrated with the container itself.

The sleeve 62 generally includes an inner layer 80 and an outer layer 82. It should be appreciated that although two layers 80, 82 are illustrated in the disclosed non-limiting embodiment, various additional layers may alternatively or additionally be provided.

The inner layer 80 may include a ferromagnetic material of a predefined inductance. That is, the induction is of a known value specifically recognizable by the induction sensor 72. The ferromagnetic material may be a metal material or other conductor by which a change in current flowing therethrough "induces" a voltage in both the conductor itself (self-inductance) and in any nearby conductors (mutual inductance).

The outer layer 82 is located around the inner layer 80 and insulates the inner layer 80, such that a user may safely hold the sleeve 62 with the container 90 therein. The outer layer 82 may be manufactured of a silicone elastomer, a heat-resistant fabric, or other heat-resistant material.

In operation, the sleeve 62 is located on the container 90, and then located within the cup holder 60 together with the container 90. As the sleeve 62 has a predefined inductance. Only if the induction sensor 72 detects that predefined inductance, will the induction-heating element 64 be operable. That is, the cup holder 60 is only operable to apply heat when the particular sleeve 62 is located therein, thus preventing operation should other metal containers, coins, or other object be placed in the cup holder 60.

Once the sleeve 62 is recognized, the induction-heating element 64 will induce a current in the induction-heating element 64. Note that both an alternating current (AC) and a pulsed direct current (DC) induction current may be used. The current in the induction-heating element 64 induces a magnetic field. Since the sleeve 62 is in close proximity to the induction-heating element 64, a current is generated in the inner layer 80 of the sleeve 62 via mutual induction. The current generated in the inner layer 80 interacts with the magnetic field and causes heat, thereby heating the beverage inside the container 90.

The temperature sensor 70 is located to measure a temperature of the beverage for communication to the processor 42 via the interface 46. The temperature of the beverage, as well as other information such as the status of the heated cup holder system 22, may be displayed on the display 50 of the interactive display system 34 (FIG. 3). As the temperature and other data is communicated to the vehicle head unit 30 via, for example, a vehicle control area network that provides a data bus for vehicle electronics, the heated cup holder system 22 is readily controlled by the user. Various controls such as temperature, increase, decrease, hold, etc., may be provided thereby.

The heated cup holder system 22 thereby advantageously utilizes the ubiquitous cardboard container that can be discarded after the beverage is consumed, yet heats or maintains the beverage therein at a desired temperature for prolonged time periods as desired by a user.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A heated cup holder system for a vehicle, comprising:
a sleeve having a sidewall by which the sleeve is receivable onto and around a container to form a container/sleeve combination, the sleeve including an insulated conductive layer along the sidewall; and
a cup holder having a bottom surface and a wall surface by which the cup holder is serviceable as a receptacle for the container/sleeve combination, the cup holder including an induction-heating element, the induction-heating element operable, when the sleeve is received in the cup holder, to induce a current in the insulated conductive layer, thereby heating the sleeve.

2. The system as recited in claim 1, wherein the insulated conductive layer is manufactured of a ferromagnetic material.

3. The system as recited in claim 2, wherein the insulated conductive layer is insulated by a surrounding outer layer along the sidewall.

4. The system as recited in claim 3, wherein the surrounding outer layer is manufactured of a silicone elastomer.

5. The system as recited in claim 1, wherein the sleeve is open-ended and the sidewall is resilient, whereby the sleeve is of an adjustable diameter, and thereby receivable onto and around containers with varying diameters to form respective additional container/sleeve combinations.

6. The system as recited in claim 5, wherein the sidewall is C-shaped.

7. The system as recited in claim 5, wherein the insulated conductive layer is manufactured of a ferromagnetic material, and insulated by a surrounding outer layer along the sidewall.

8. The system as recited in claim 7, wherein the surrounding outer layer is manufactured of a silicone elastomer.

9. The system as recited in claim 1, wherein:
the sleeve is open-ended, and the sidewall is resilient and C-shaped, whereby the sleeve is of an adjustable diameter, and thereby receivable onto and around containers with varying diameters to form respective additional container/sleeve combinations; and
the insulated conductive layer is manufactured of a ferromagnetic material, and insulated by a surrounding outer layer along the sidewall manufactured of a silicone elastomer.

10. The system as recited in claim 1, wherein the induction-heating element is included in the cup holder along the bottom surface.

11. The system as recited in claim 1, wherein the induction-heating element is included in the cup holder along the wall surface.

12. The system as recited in claim 1, wherein the container is manufactured of at least one of a cardboard material and a foam material.

13. A vehicle, comprising:
a heated cup holder system including:
a cup holder having a bottom surface and a wall surface by which the cup holder is serviceable as a receptacle, the cup holder including an induction-heating element, the induction-heating element operable to induce a current in conductive items received in the cup holder;
a sleeve having a sidewall by which the sleeve is receivable onto and around a container to form a container/sleeve combination receivable in the cup holder, the sleeve including an insulated conductive layer along the sidewall, the insulated conductive layer responsive, when the sleeve is received in the cup holder, to operation of the induction-heating element to have a current induced therein, whereby the sleeve is heated; and
at least one sensor operable to detect information about the cup holder; and
a control system in communication with the heated cup holder system, the control system operable to operate the induction-heating element based on the detected information about the cup holder.

14. The vehicle as recited in claim 13, wherein:
the at least one sensor includes an induction sensor operable to detect the inductance of conductive items received in the cup holder;
the sleeve is of a predefined inductance defined by the insulated conductive layer; and
the control system is operable to operate the induction-heating element only when the detected inductance is the predefined inductance.

15. The vehicle as recited in claim 13, wherein:
the at least one sensor includes a temperature sensor operable to detect the temperature of items received in the cup holder; and
the control system is operable to operate the induction-heating element based on the detected temperature.

16. The vehicle as recited in claim 13, wherein the sleeve is open-ended and the sidewall is resilient, whereby the sleeve is of an adjustable diameter, and thereby receivable onto and around containers with varying diameters to form respective additional container/sleeve combinations.

17. The vehicle as recited in claim 16, wherein the sidewall is C-shaped.

18. The vehicle as recited in claim 16, wherein the insulated conductive layer is manufactured of a ferromagnetic material, and insulated by a surrounding outer layer along the sidewall.

19. The vehicle as recited in claim 18, wherein the surrounding outer layer is manufactured of a silicone elastomer.

20. The vehicle as recited in claim 13, wherein the induction-heating element is included in the cup holder along the bottom surface.

21. The vehicle as recited in claim 13, wherein the induction-heating element is included in the cup holder along the wall surface.

22. The vehicle as recited in claim 13, wherein the container is manufactured of at least one of a cardboard material and a foam material.

23. A vehicle, comprising:
a heated cup holder system including:
a cup holder having a bottom surface and a wall surface by which the cup holder is serviceable as a receptacle, the cup holder including an induction-heating element, the induction-heating element operable to induce a current in conductive items received in the cup holder;
an open-ended sleeve having a resilient sidewall by which the sleeve is receivable onto and around containers with varying diameters to form respective container/sleeve combinations receivable in the cup holder, the sleeve including an insulated conductive layer along the sidewall, the insulated conductive layer manufactured of a ferromagnetic material defining a predefined inductance of the sleeve, insulated by a surrounding outer layer along the sidewall, and responsive, when the sleeve is received in the cup holder, to operation of the induction-heating element to have a current induced therein, whereby the sleeve is heated;
an induction sensor operable to detect the inductance of conductive items received in the cup holder; and
a temperature sensor operable to detect the temperature of items received in the cup holder; and
a head unit in communication with the heated cup holder system, the head unit operable to:
implement user controls for the heated cup holder system; and
operate the induction-heating element only when the detected inductance is the predefined inductance, the operation according to the user controls and based on the detected temperature.

24. The vehicle as recited in claim 23, wherein the induction-heating element is included in the cup holder along the bottom surface.

25. The vehicle as recited in claim 23, wherein the induction-heating element is included in the cup holder along the wall surface.

26. The vehicle as recited in claim 23, wherein the container is manufactured of at least one of a cardboard material and a foam material.

* * * * *